United States Patent [19]

Edelen et al.

[11] Patent Number: 4,873,881
[45] Date of Patent: Oct. 17, 1989

[54] ELECTRICALLY ACTUATED X-Y SHIFTING MECHANISM

[75] Inventors: Stephen A. Edelen, Battle Creek; David T. Allen, Kalamazoo; Bill E. Zylman, Portage, all of Mich.

[73] Assignee: Eaton Corporation, Cleveland, Ohio

[21] Appl. No.: 294,030

[22] Filed: Jan. 6, 1989

[51] Int. Cl.[4] ............... F16H 5/44; B60K 20/16
[52] U.S. Cl. .................. 74/336 R; 74/335; 74/365; 74/866
[58] Field of Search ......... 74/471 XY, 473 R, 477, 74/335, 336 R, 337, 365, 866; 364/424.1

[56] References Cited

U.S. PATENT DOCUMENTS

| 4,428,248 | 1/1984 | Brouckson et al. | 74/335 |
| 4,449,416 | 5/1984 | Huitema | 74/365 X |
| 4,570,765 | 2/1986 | Makita | 74/335 X |
| 4,619,151 | 10/1986 | Trachman et al. | 74/335 |
| 4,621,328 | 11/1986 | Arai et al. | 74/365 X |
| 4,690,008 | 9/1987 | Klatt | 74/336 R |
| 4,691,585 | 9/1987 | Gottfried | 74/471 XY X |
| 4,718,307 | 1/1988 | Yabe et al. | 74/866 |
| 4,784,007 | 11/1988 | Ishida et al. | 74/336 R X |
| 4,796,485 | 1/1989 | Ebina | 74/866 |

Primary Examiner—Dwight G. Diehl
Attorney, Agent, or Firm—A. E. Chrow

[57] ABSTRACT

An electrically actuated shift mechanism (100) is provided that is mountable upon a manual mechanical change gear transmission and operable to move a shift finger (20) in an (X—X) direction into registration with a selected shift rail and then move the shift rail in a (Y—Y) direction to effect the gear shift is response to either a selected operator input signal ($S_1$) or a speed signal ($S_2$).

9 Claims, 4 Drawing Sheets

ELECTRICALLY ACTUATED X-Y SHIFTING MECHANISM

INTRODUCTION

This invention relates to a shifting mechanism of the "X—Y" type for cooperation with a shift bar housing assembly for selectively shifting a mechanical change gear transmission and more particularly to an electrically actuated X—Y shifting mechanism which is effective to cooperate with a substantially standard shift bar housing assembly of the type normally manually controlled by a shift lever allowing for automatic or semiautomatic shifting of an otherwise substantially standard normally manually shifted mechanical transmission.

BACKGROUND OF THE INVENTION

Shift bar housing assemblies for mechanical change gear transmissions comprising a plurality of generally parallel, independently axially movable shift bars to be selected and axially moved to effect engagement/disengagement of a particular gear ratio are well known in the prior art as may be seen by reference to U.S. Pat. Nos. 2,951,392; 4,455,883; 4,575,029; 4,567,785 and 4,584,895, the disclosures of all of which are hereby incorporated herein by reference.

Typically, such shift bar housings are manually controlled and operated by a shift finger fixed to a directly mounted shift lever or to the cross shaft of a remotely controlled shifting mechanism. Interlock mechanisms are usually provided to prevent movement of more than one shift rail at a time from the axially centered or neutral positions thereof.

Automatic and semi-automatic mechanical transmissions based upon generally standard mechanical transmissions provided with electric/pneumatic actuators controlled by a control unit are well known in the prior art as may be seen by reference to U.S. Pat. Nos. 4,648,290 and 4,361,060, the disclosures of which are hereby incorporated herein by reference.

Automatically controlled X—Y type shifting mechanisms wherein a shift finger is automatically moved in the X or rail selection direction and then in the Y or gear engagement/disengagement direction are known in the prior art as may be seen in reference to U.S. Pat. No. 2,931,237, the disclosure of which is hereby incorporated by reference.

Shift bar housing assemblies utilizing pressurized fluid actuated pistons and the like to control each shift rail in an automatic or semi-automatic mechanical transmission are known in the prior art as may be seen by reference to U.S. Pat. No. 4,445,393.

The prior art shifting mechanisms for providing automatic and/or semi-automatic shifting of mechanical change gear transmissions normally utilized with direct and/or remote manual shifting mechanisms were not totally satisfactory as substantial modification of the standard shift bar housing assembly was required; complicated and costly valving and support equipment such as reservoirs, driers and filters, and/or fluid/electrical connections were required, the controls were complicated and/or expensive to manufacture, assemble and/or repair; commonly required the availability of air, and/or the controls did not provide a rapidly and positively obtainable neutral position and a reliable indication device therefor.

SUMMARY OF THE INVENTION

In accordance with the present invention, the drawbacks of the prior art have been minimized or overcome by the provision of a relatively simple and reliable X—Y shifting mechanism which is easily connectable to an electrical power source and is compatible with the shift bar housing assemblies of normally manually shifted mechanical transmissions without modification thereto.

The above is accomplished by providing an X—Y shifting mechanism which will bolt onto a standard shift bar housing at the same opening normally receiving a shift lever tower mechanism (see U.S. Pat. No. 3,850,047, the disclosure of which is hereby incorporated herein by reference) and from which extends a shift finger substantially identical to that associated with a manually controlled shift lever.

The X—Y shift mechanism is preferably electrically controlled and acutated from a vehicular onboard electrical power source such as a battery.

Accordingly, it is an object of the present invention to provide a new and improved electrically actuated X—Y shift mechanism for a mechanical transmission.

This and other objects and advantages of the present invention will become apparent from a reading of the description of the preferred embodiment taken in view of the attached drawings.

DESCRIPTION OF SOME PREFERRED EMBODIMENTS

Figure 1:
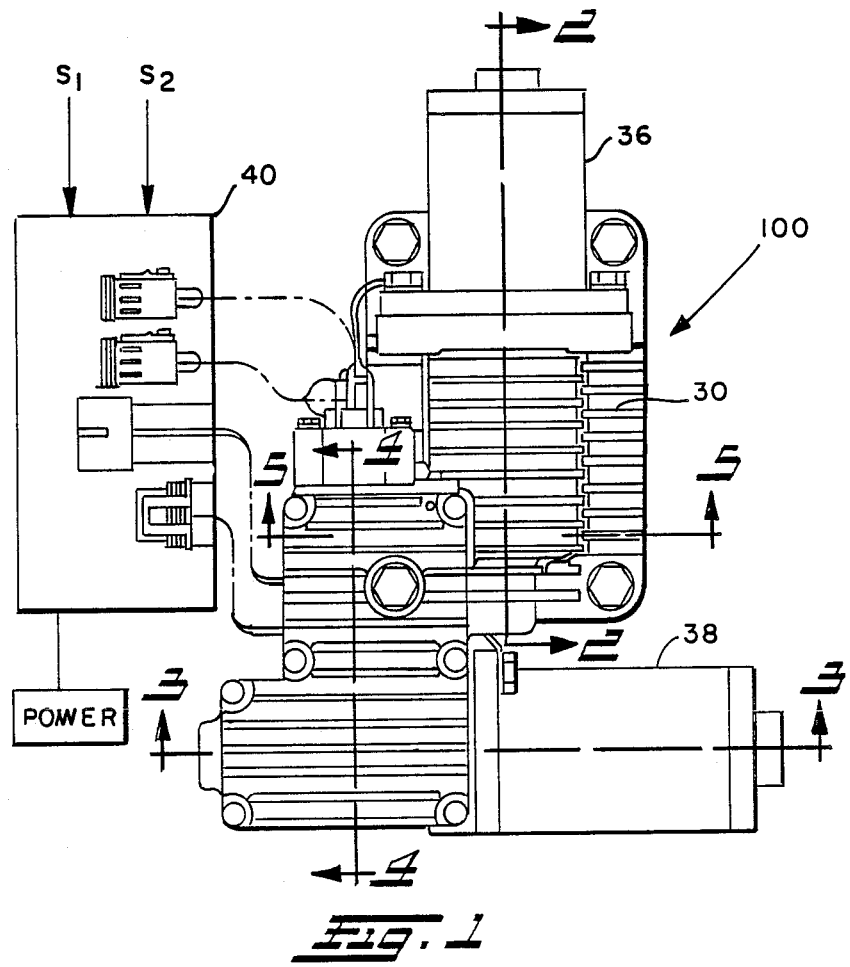
FIG. 1 is top view of an embodiment of the shifting mechanism of the invention.

In this disclosure, certain terminology will be used for convenience in reference only and will not be limiting. For example, the terms "forward" and "rearward" will refer to directions forward and rearward of the vehicle in which the terminology is used. The terms "inward" and "outward" will respectively refer to directions forward and away from the geometric center of the apparatus. The terms "pivot" and "rotate" as used herein will both refer to rotational movement of a specified object about an axis. The foregoing applies to normal derivative of the above mentioned terms of similar import.

Truck change gear mechanical transmissions are well known in the prior art as may be seen by reference to U.S. Pat. No. 3,105,395, hereby incorporated by reference. First class mechanisms for directly shifting such change gear transmissions are well known in the art as may be seen by references to U.S. Pat. Nos. 3,934,485 and 4,022,077, hereby both incorporated herein by reference. Remote controls for shifting transmissions of this type are also well known in the art as may be seen by reference to U.S. Pat. Nos. 2,040,549; 4,104,929, or 4,157,740 and 4,206,826, all hereby incorporated herein by reference. Such transmissions typically included a shift bar housing assembly an example of which may be seen in FIG. 7. The shift bar housing assembly typically comprises a plurality of substantially parallel, spaced-apart, axially movable shift rails, 8, 10 and 12, each of which carry a shift fork 14, 16 and 18, respectively, fixed thereto for axial movement therewith. As is well known, the shift forks are each associated with a positive clutch mechanism for selectively engaging/disengaging a first and/or a second gear to a shaft.

Typically, shifting of such transmissions is accomplished by selecting a shift rail by moving an engagement member such as a shift finger 20 axially or pivotably along the axis X—X into alignment with a shift block or notch 22, 24 or 26 carried by the selected shift rail and then causing axial movement of the selected shift rail by axially moving or pivoting the shift finger to apply an axial force in the direction of axis Y—Y. In a typical manual transmission, the above is accomplished by utilization of a first class lever which could be pivoted in the directions of axis X—X and Y—Y or by utilization of a shift shaft carrying a shift finger thereon which was axially movable in the direction of axis X—X and then pivotably movable about the axis X—X to apply an axial force in the direction of the axis Y—Y.

In the case of directly shifted transmission, the remote end of a first class lever was commonly utilized to align with and then apply an axial force to the shift block or slot member carried by a selected shift rail while in the case of remotely shifted transmission a torque arm having one end thereof fixed for rotation and axial movement with the shift shaft was typically utilized to apply a selective axial and rotational movement to a shift finger carried for movement with the shift shaft.

Figure 7:
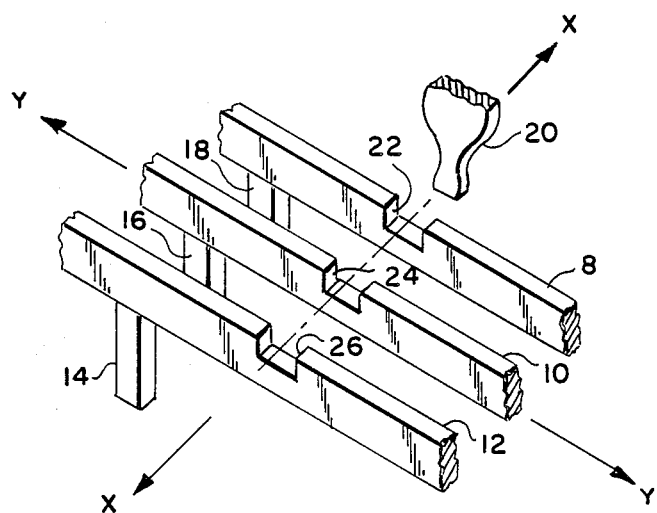
FIG. 7 is a perspective view of shift rails commonly used in mechanical gear change transmissions.

It is with the type of shift bar housing assembly illustrated in FIG. 7 and normally controlled by a manual shift lever or the like that the X—Y shifter of the present invention is advantageously utilized to provide automatic or semi-automatic operation of a mechanical transmission.

Figure 2:
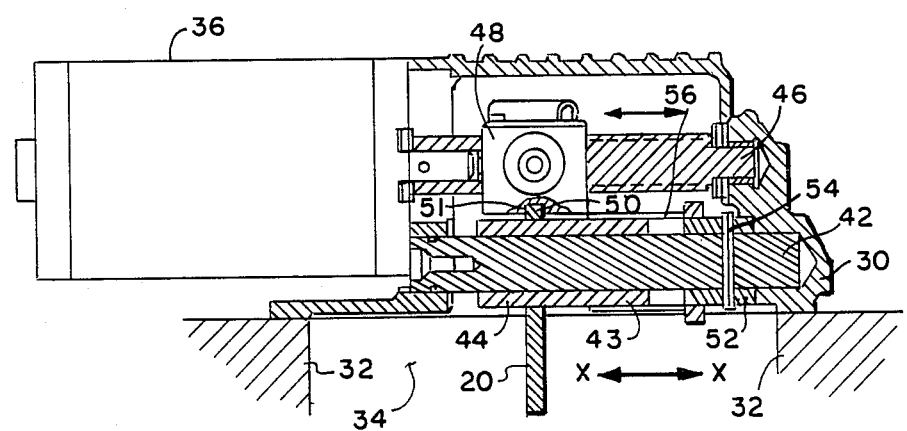
FIG. 2 is a cross-section along view line 2—2 of the mechanism of FIG. 1.

In FIG. 1, shifting mechanism 100 of the invention has a housing 30 that is mountable upon a mechanical gear change shift bar housing 32. As shown in FIG. 2, shift finger 20 is able to enter through opening 34 in housing 32 and selectively engage the shift rails previously described in FIG. 7.

Mechanism 100 has a first electrical motor 36 mountable thereon that is operable to move shift finger 20 in the X—X direction as hereinafter described with respect to FIG. 2 and has a second electrical motor 38 mountable thereon that is operable to move shift finger 20 in the Y—Y direction as hereinafter described with respect to FIGS. 3-5.

Motors 36 and 38 are powered by a suitable power source carried by the vehicle such as the vehicle battery. Mechanism 100 is controlled by suitable electrical circuit means 40 well known to those skilled in the art. Circuitry 40 is operable to receive and process a gear shift select signal $S_1$ entered by an operator when mechanism 100 is operating as a semi-automatic transmission shift control or to receive and process a speed signal $S_2$ such as a drive shaft or vehicle wheel speed signal where mechanism 100 is operating as an automatic transmission shift control. Upon processing signals $S_1$ or $S_2$, circuitry 40 is operable to energize motor 36 and cause it to move shift finger 20 in the X—X direction into registration with the particular shift rail selected and then motor 38 is energized to cause shift finger 20 to move in the selected shift rail Y—Y direction to effect the particular gear engagement or disengagement desired with appropriate sensors providing information between circuitry 40 and motors 36 and 38 such that they sequentially operate in the manner required.

In FIG. 2, a first shaft member 42 is rotatably mounted on housing 30. A carrier member 44 is disposed coaxially about shaft 42. Carrier member 44 is operable to move in opposite axial directions along shaft 42 as well as being able to rotate in opposite rotational directions thereabout.

Shift finger 20 is secured substantially transversly to carrier member 44 such that rotation of carrier member 44 about the central rotational axis of shaft 42 causes shift finger 20 to move in the Y—Y direction.

A second shaft 46 is drivingly connected to motor 36. Shaft 46 is externally threaded and journaled for rotation on housing 30 in spaced-apart relationship to shaft 42 with their respective central rotational axis in substantial parallel alignment.

A first threaded traversing member 48 is threadingly engaged with the threads of shaft 46 and operable to traverse in opposite axial directions therealong in response to rotation of shaft 46 in opposite rotational directions caused by motor 36.

Carrier member 44 and traversing member 48 are operably connected such that opposite axial movement of traversing member 48 causes carrier member 44 to move shift finger 20 in the X—X direction whilst enabling carrier member 44 and shift finger 20 to rotate in opposite rotational directions about shaft 42 and thereby move shift finger 20 in the Y—Y direction. Preferably the connection between carrier member 44 and traversing member 48 enabling traversing member 48 to move carrier member 44 and finger 20 in the X—X direction is provided by a protuberance such as annular portion or shoulder 50 of finger 20 extending into an arcuate groove 51 in traversing member 48 facing theretowards as shown in FIG. 2 and more clearly in the perspective view of another embodiment of the mechanism of the invention shown in FIG. 8. Protuberance 50 and groove 51 cooperate such that protuberance 50 is able to rotate relative groove 51 so as to enable finger 20 to rotate in the Y—Y direction about shaft 42 as well as engage the opposite side walls of groove 51 and carrier member 44 urge finger 20 axially in the X—X direction in response to movement of traversing member 48 in the X—X direction.

Figure 8:
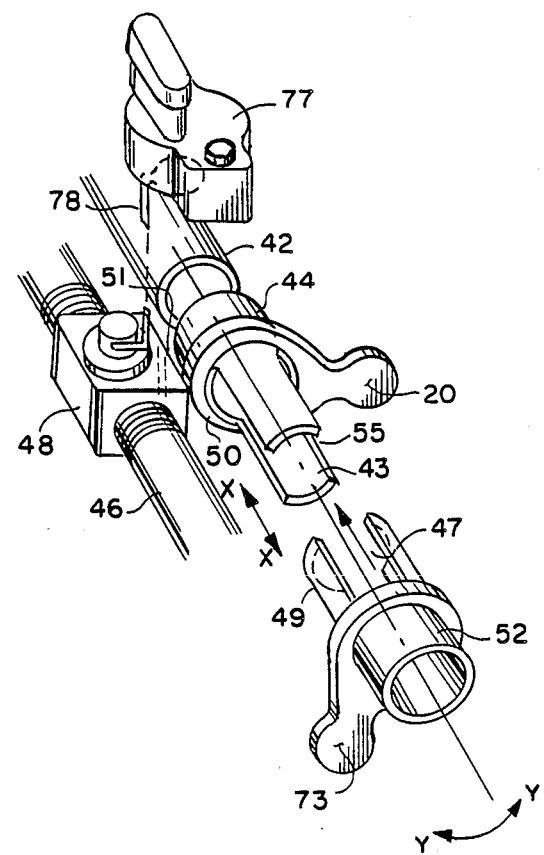
FIG. 8 is an exploded perspective view of a portion of the mechanism shown in FIG. 2.

The preferred means by which carrier member 44 and finger 20 are rotated about shaft 42 is perhaps best illustrated in FIG. 8 where carrier member 44 is provided with at least one and preferably a plurality of circumferentially spaced elongate teeth or fingers 43 that are disposed coaxially about and in substantial parallel relation with shaft 42 and are respectively registerable with and extend into a corresponding plurality of circumferentially spaced slots or spaces 47 in rotor member 52 which is secured to shaft 42 by suitable means such as pin 54 shown in FIG. 2.

Rotor 52 is likewise provided with a plurality of teeth or fingers 49 shown in FIG. 8 that are in substantial parallel alignment with shaft 42 and are registerable with and extend into a corresponding plurality of slots or spaces 35 in carrier member 44.

Teeth 43 and 49 and slots or spaces 35 and 47 are adapted such that teeth 43 and 49 are able to slide along spaces 47 and 35 respectively as carrier 44 moves in the X—X direction and rotation of rotor member 52 by shaft 42 causes teeth 49 to interlockingly engage with teeth 43 and rotate carrier member 44 and finger 20 in the Y—Y direction.

Figure 3:
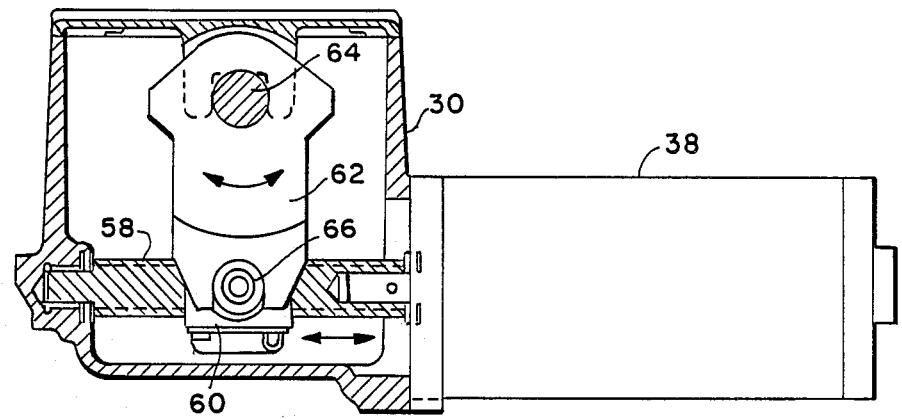
FIG. 3 is a cross-section along view line 3—3 of the mechanism of FIG. 1.

In FIG. 3, a third shaft 58 is drivingly connected to motor 38. Shaft 58 is externally threaded and journaled for rotation on housing 30 in spaced-apart relationship to shafts 42 and 46 with its central rotational axis in substantial transverse relationship thereto. A second threaded traversing member 60 is threadingly engaged with the threads of shaft 58 and operable to traverse in opposite axial directions therealong in response to rotation of shaft 58 in opposite directions caused by motor 38. Preferably threaded shafts 46 of FIG. 2 and 58 of FIG. 3 are ball screws and traversing members 48 of FIG. 2 and 60 of FIG. 3 are ball nuts well known to those skilled in the art.

A fourth shaft, 64 is rotatably mounted in housing 30 in spaced-apart relationship to shaft 58 with its central rotational axis substantially transverse to the central rotational axis of shaft 58 and substantially parallel to the central rotational axis of shafts 42 and 46.

A first lever arm 62 is pivoted about shaft 64 by pins 66 or the like extending from opposite sides of the traversing member 60. Arm 62 is secured to shaft 64 such that opposite axial movement of traversing member 60 causes lever arm 62 rotate shaft 64.

Figure 4:
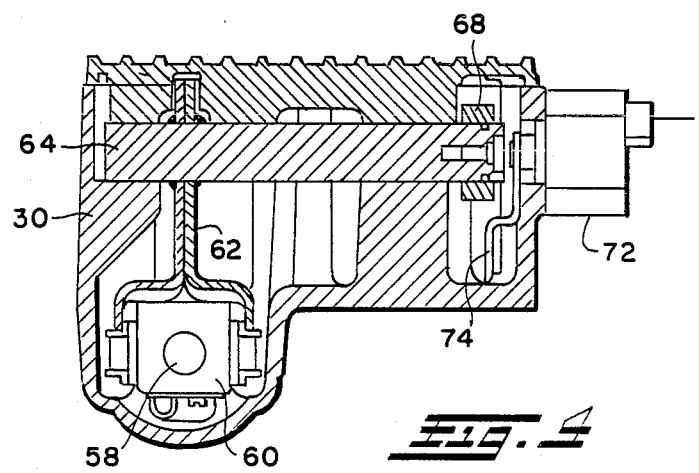
FIG. 4 is a cross-section along view line 4—4 of FIG. 1.
Figure 5:
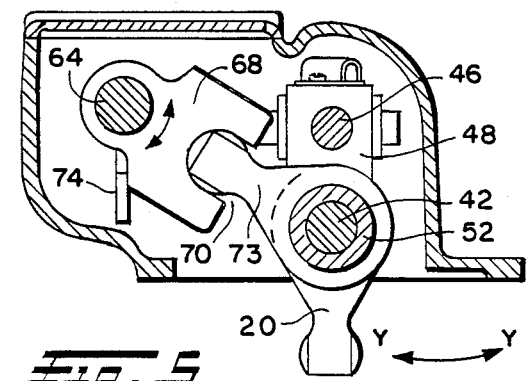
FIG. 5 is a cross-section along view line 5—5 of FIG. 1.

As shown in FIG. 4, a yoke member 68 is secured to shaft 64 with its open end 70 facing towards shaft 42 as shown in FIG. 5. Sensor means such as a suitable rotary potentiometer 72 is preferably mounted on housing 30 having a lever arm 74 engaged with yoke 68 which, when rotating, causes lever arm 74 to rotate and change the resistance of potentiometer 72 to provide a signal indicative of the rotary position of shaft 64 which, in turn, is indicative of the position of shift finger 20 as hereinafter described with respect to FIG. 5.

In FIG. 5, a second lever arm 73 is secured at one end to rotator member 52 and has an opposite end that extends into the open end of yoke member 68 and cooperates therewith such that rotation of yoke member 68 by shaft 64 causes lever arm 73 to rotate rotator member 52 which causes carrier member 44 to rotate as hereinbefore described with respect to FIGS. 2 and 8.

Figure 6:
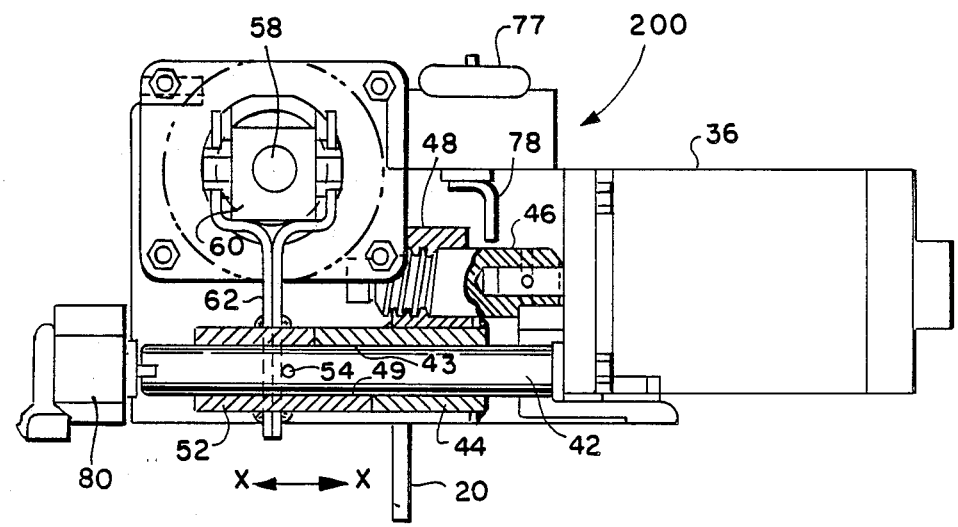
FIG. 6 is a cross-section view of another embodiment of the mechanism of the invention.

One means by which rotator member 52 is able to rotate carrier member 44 is shown in another embodiment of the invention in the form of mechanism 200 shown in FIG. 6. In FIG. 6, mechanism 200 has previously described motor 36; first threaded shaft 46; first traversing member 48; first shaft member 42; second threaded shaft member 58; and second traversing member 60.

Lever arm 62 however is secured directly to rotator member 52 rather than indirectly by means such as yoke member 68.

Rotator member 52 is preferably able to rotate carrier member 44 in the manner hereinbefore described by having circumferentially spaced fingers or teeth 49 and 43 respectively extending towards each other in substantial parallel alignment with the central rotational axis of shaft 42. Fingers or teeth of one of members 44 and 52 are respectively registerable with the spaces in the other member and extend thereinto for a distance sufficient to insure the engagability of fingers 76 of both members throughout the axial distance that carrier member travels in opposite directions along shaft 42 as hereinbefor described with respect to FIGS. 2 and 8.

Also illustrated in FIGS. 6 and 8, is a sensor member such as rotary potentiometer member 77 having a lever arm 78 against which traversing member 48 abutts to provide an instructional signal when shift finger 20 is in registration with the block mechanism of the particular shift rail selected. Additionally, FIG. 6 shows a rotary potentiometer 80 connected directly to the end of shaft 42 for providing a signal indicative of the rotational position of shaft 42 rather than indirectly as previously described for potentiometer 72.

Although described herein as having two electrical motor 36 and 38, it is to be understood that the mechanism of the invention may, if desired, operate with but a single electrical motor that is connected to threaded shafts 46 and 58 by suitable electrical clutches that are controlled so as to enable the motor to selectively rotate shafts 46 and 58 so as to move shift finger 20 in the X—X and Y—Y direction according to the rail shift instruction signed and gear shaft instruction signal received thereby.

Thus, by means of at least one electrical motor and the other components herein described, the mechanism of the invention is operative to be mounted on a mechanical gear change transmission with the shift finger 20 extending into and operable to move in the X—X direction into registration with a particular shift rail selected and thence move in the Y—Y direction to effect the gear shift change selected in response to either a seleced operator input signal or a speed signal processed by suitable electrical circuitry and sensors to enable the motors to cooperate in the manner described herein.

What is claimed is:

1. An electrically actuated X—Y shifting mechanism for controlling the shifting of change gears of a mechanical change gear transmission of the type having at least one shift rail axially movable in a first axial (Y—Y) direction in a shift bar housing, said shift rail having a shift fork associated therewith and a block mechanism selectively engagable by an inner end of a mountable operated shift lever extending through an opening in the shift bar housing that is movable in a second (X—X) direction substantially transverse to the (Y—Y) direction for registration with the shift rail block mechanism and is movable in the (Y—Y) direction for engaging and causing said block mechanism to move the shift rail associated therewith axially to cause the shift fork associated therewith to effect the change gear shift, said mechanism comprising;

a shift mechanism housing mountable to said shift bar housing and having a shift finger extending into the shift rail housing opening therefrom, a first shaft member mounted for rotation on the mechanism housing and having the central rotational axis thereof in substantial parallel alignment with the (X—X) direction, a first carrier member disposed coaxially about the first shaft member and axially movable in opposite directions therealong and rotatable in opposite rotational directions about the rotational axis thereof, said carrier member having the shift finger fixedly secured thereto such that the axial movement of carrier member moves the shift finger in the (X—X) direction and rotational movement of the carrier member moves the shift finger in the (Y—Y) direction, a second shaft member journaled for rotation in opposite rotational directions on the mechanism housing in spaced-apart relationship to the first shaft member, said shaft member externally threaded and having a central rotational axis thereof in substantial parallel alignment with the first shaft member central rotational axis, a first threaded traversing member threadingly engaged with the second shaft member and operable to traverse in opposite axial directions therealong in response to rotation of the second shaft member in opposite rotational directions, said traversing member operably connected to the first carrier member by means enabling the traversing member to move the first carrier member axially along the first shaft member in and cause the shift finger to move in the (X—X) direction whilst enabling the first carrier member to rotate in opposite rotational directions about the first shaft member and cause the shift finger to move in the (Y—Y) direction, at least one electrical motor mounted on the mechanism assembly and powered by an electrical power source, said motor drivingly connected to the second shaft member and operable to rotate the second shaft member in a rotational direction determined by an electrical shift rail selection instruction signal received thereby, means enabling the motor to rotate the first shaft member in a rotational direction determined by an electrical gear change shift instruction signal received thereby, means for rotating the first carrier member in response to rotation of the first shaft member, and electrical circuit control means, operative to provide said shift rail selection instruction signal and said gear change shift instruction signal to in response to one of a selected operator input signal ($S_1$) or speed signal ($S_2$) received thereby.

2. The mechanism of claim 1 wherein the carrier member is operably connected to the traversing member by means of the traversing member having a groove therein facing towards the carrier member and the carrier member having a protuberance extending therefrom into the groove, said protuberance and groove adapted such that the protuberance is able to rotate in a plane substantially parallel to the axis of the groove and is able to engage the opposite side walls thereof to enable the traversing member to move the carrier member in opposite axial directions along the first shaft member.

3. The mechanism of claim 2 wherein the protuberance is a portion of the shift finger.

4. The mechanism of claim 1 wherein the means enabling the motor to rotate the first shaft member comprises;

a third shaft member, said third shaft member externally threaded and journaled for rotation on the mechanism housing, said third shaft member drivingly connected to the motor in spaced-apart relationship to the first and second shaft members and having a central rotational axis thereof that is in substantial transverse alignment with the respective rotational axis thereof, a second threaded traversing member threadingly engaged with said third shaft member and operative to traverse in opposite axial directions therealong in response to rotation of said third shaft member in opposite rotational directions by the motor, and a first lever arm pivotably secured at one end to the second shaft member and operatively connected thereto such that said lever arm pivots relative to the second traversing member and rotates the first shaft member in opposite rotational directions in response to the traverse of the second traversing member in opposite axial directions along the third shaft member.

5. The mechanism of claim 4 wherein the first lever arm is operatively connected to the first shaft member by said lever arm being secured to a fourth shaft member mounted for rotation on the mechanism housing in spaced-apart relationship to the first, second, and third shaft members and having a central rotational axis thereof in substantial transverse alignment with the third shaft member rotational axis, a yoke member fixedly secured to the fourth shaft member and having an open end thereof facing towards the first shaft member, a second lever arm having one end secured to the first shaft member and an opposite end extending into the yoke member opening and cooperating therewith such that rotation of the first lever arm in opposite rotational directions causes the fourth shaft member to rotate the yoke member in opposite rotational directions and thereby cause the second lever arm to rotate the first shaft member in opposite rotational directions.

6. The mechanism of claim 1 wherein the means for rotating the first carrier member in response to rotation of the first shaft member comprises a plurality of circumferentially spaced elongate teeth extending from the first carrier member coaxially about the first shaft member in substantial parallel relationship to the rotational axis thereof, a rotator member disposed coaxially about the first shaft member and secured for rotation therewith and having a plurality of circumferentially spaced elongate teeth extending coaxially about the first shaft member into the spaces between the carrier member teeth in substantial parallel alignment with the first shaft member rotational axis, said carrier member and rotator member teeth and spaces adapted such that the rotator member teeth interlockingly engage the carrier member teeth to cause the rotation thereof upon rotation of the rotator member whilst enabling the carrier member teeth to move axially in opposite axial directions relative the rotator member teeth upon opposite axial movement of the carrier member.

7. The mechanism of claim 1 having two electrical motors comprising a first motor drivingly connected to the second shaft member and operable to rotate the second shaft member according to the rail selection instruction signal received thereby and a second motor operable to rotate the first shaft member in a rotational direction according to the electrical gear change shaft instruction signal received thereby.

8. The mechanism of claim 1 including rail selection sensor means operative to inform the circuit control means when the shift finger is in registration with the shift rail block mechanism.

9. The mechanism of claim 1 or 8 including shift sensor means operative to inform the control circuit means when the gear change shift is effected.

* * * * *